G. Twigg,
Shearing App's.
No. 107,128. Patented Sep. 6, 1870.
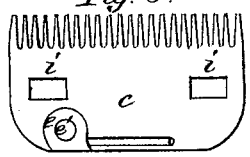
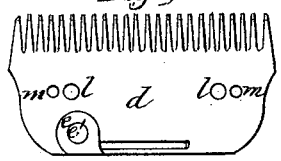
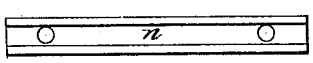
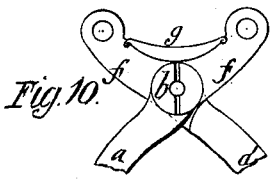
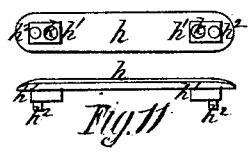
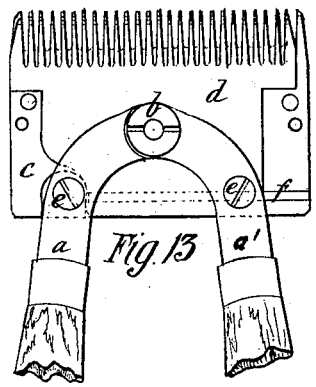
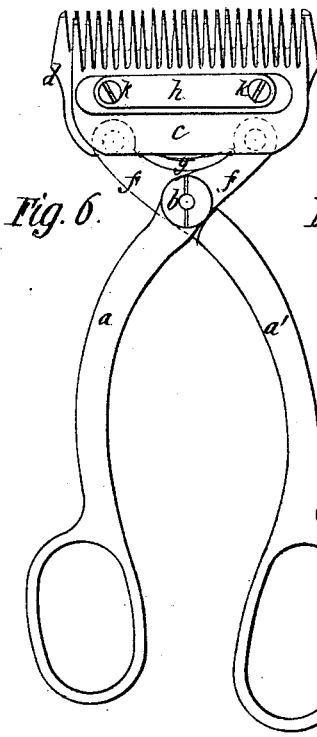
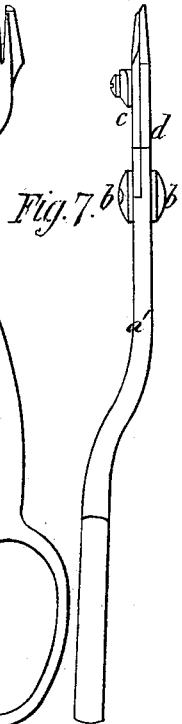
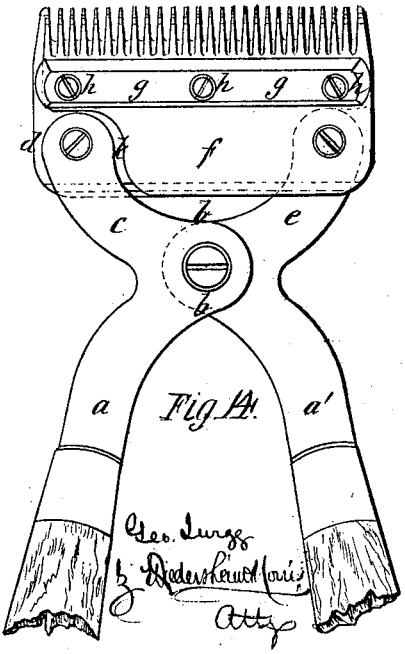
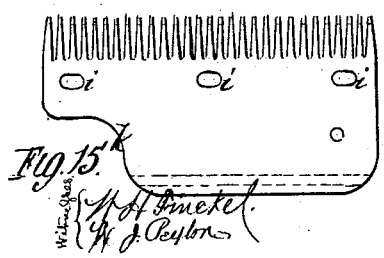

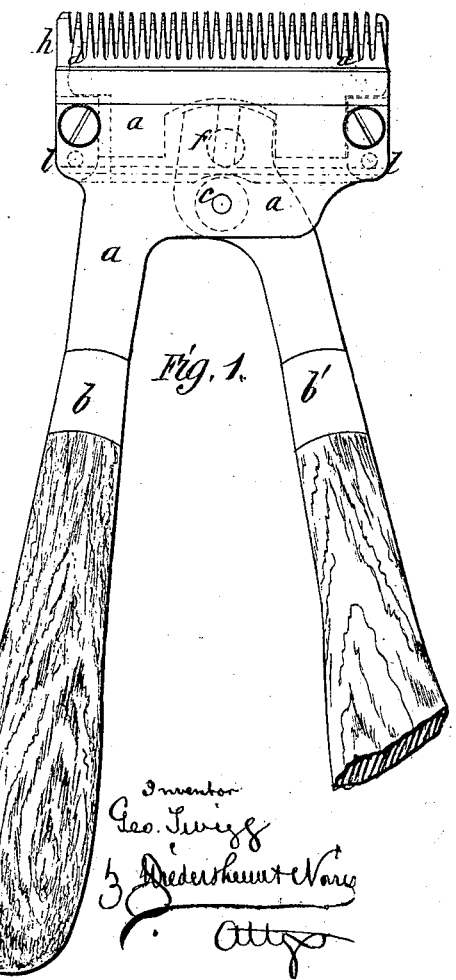

UNITED STATES PATENT OFFICE.

GEORGE TWIGG, OF BIRMINGHAM, ENGLAND.

Letters Patent No. 107,128, dated September 6, 1870.

IMPROVEMENT IN SHEARING AND CLIPPING APPARATUS.

The Schedule referred to in these Letters Patent and making part of the same.

*To all whom it may concern:*

Be it known that I, GEORGE TWIGG, of Birmingham, in the county of Warwick and Kingdom of England, manufacturer, a subject under the crown of Great Britain, have invented "Improvements in Shearing and Clipping Apparatus;" and I do hereby declare that the following is a full and exact description of my said invention, that is to say—

My invention more particularly refers to the description of shearing or clipping apparatus used for shearing or clipping horses and other animals, or for similar or other purposes for which such apparatus may be applicable, such as clipping grass, and consisting of a pair of metal plates working upon each other by means of leverage, the cutting-edges being formed with a series of small blades or shears, and operating after the manner of scissors.

My improvements refer to the arrangement and construction of the actuating or leverage parts of such apparatus, and have for their object greater facility and accuracy in working the cutters or shears, increased strength and rigidity of the moving parts, with less tendency for such parts to become loose in wear.

Referring to the drawing—

Figure 1 is a front view; and

Figure 2, an edge view of one form of my improved shearing or clipping apparatus.

Figures 3, 4, and 5, showing detached portions of the same.

$a$ is a carrier-plate, secured to or forming part of the handle, $b$, and provided with a strip of hard metal, $a^1$, for the purpose of resisting the wear upon the parts.

$b'$ is the actuating or lever-handle, working upon the pin $c$, shown more clearly in fig. 3, and giving a horizontal to-and-fro motion to the inner cutter-plate, $d$, which is pierced, as shown in fig. 4, at $e$, to receive the stud-button $f$, the part $f'$ of such stud-button fitting into the slot $g$ of the lever-handle $b'$, by means of which the cutter-plate $d$ will be moved a sufficient distance to the right or left, in the operation of shearing or clipping, such movement being regulated by the carrier-plate $a$, being formed with a recessed part, $a^2$, for the head of the lever-handle $b'$ to work in, or the head of the lever-handle may work between suitable raised stop-pieces or blocks.

The back shearing-plate $h$ is secured by screw-pins $i$ to the carrier-plate $a$, and is thus rigid with it. Fig. 5 is a view of the inner face of the back cutter-plate $h$, showing the screw-holes and studs $k$, fitting into corresponding recesses in the carrier-plate $a$, and thus increasing the security of the parts.

$l$ is a groove, cut upon the face of both the cutter-plates, and formed to receive a length of wire, $l'$, or an angular bar of metal, which acts as a set-up, for the purpose of keeping the inner surfaces of the small blades or shears in close contact with each other, and also acting as a guide for insuring the parallelism of the cutter-plates during the operation of shearing or clipping, or, if preferred, the one cutter-plate may have a set-up formed upon it to fit into a groove cut in the other shearing-plate.

Another form of my improved shearing or clipping apparatus is shown in front and edge views, Figures 6 and 7, Figures 8, 9, 10, and 11, being detached views of parts of such apparatus. In this arrangement both the handles $a$ and $a^1$ work freely upon a center, $b$, with a scissors joint and action.

Figs. 8 and 9 represent the inner face of the cutter or shearing-plates $c$ and $d$, which are formed with recessed parts $e$, and studs $e'$, so as to receive the arms $f$ of the handles $a$ and $a^1$, fig. 10 showing the scissor joint and center $b$; the arms $f$, and also a small spring, $g$, which will have a constant tendency to keep the handles extended.

Figure 11 shows, in under side and edge views, a securing-bolt or bar, $h$, formed with projections and studs, $h^1$ and $h^2$, the projecting parts $h^1$ working in the guide-slots $i$, of the top cutter-plate $c$, fig. 8. The shearing-plates $c$ and $d$ are secured by means of screw-pins passing through the projections of the bolt or bar $h$ at $k$, and the back shearing-plate $d$ at $l$, the studs $h^2$ of the securing-bolt or bar fitting into recesses, $m$, in the back-plate; or the connection of the shearing-plates may be effected as shown in section, Figure 12, by means of a T-piece, $n$, fitted within suitably formed grooves in the shearing-plates, the securing of the parts being effected by means of screws $o$.

Again, as shown in Figure 13, I connect the two lever-handles $a$ and $a^1$ at $b$, and attach the handle $a$ to the back shearing-plate $c$, and the handle $a^1$ to the top shearing-plate $d$, by means of screw-pins $e$, screwing into the plates, the handles working upon such pins, and imparting a horizontal to-and-fro movement to the shearing-plates, the parallelism being maintained by means of the set-up or guide $f$. I sometimes propose using with this description of shearing or clipping apparatus a carrier-plate, similar to $a$, fig. 1. In fig. 13 are shown the screw-holes, and studs for attaching the same.

Or, as shown in Figure 14, I connect the handles $a$ $a^1$ by means of a knuckle-joint at $b$, and attach the arm $c$ of the handle $a$ to the back shearing-plate $d$, and the arm $e$ of the handle $a^1$ to the front shearing-plate $f$.

$g$ is a connecting-bar for securing the parts, by means of screw-pins $h$ passing through slots in the front plate, and screwing into the back plate. The front plate $f$ is shown detached at Figure 15.

$i$ are the slots through which the screw-pins $h$ pass.

In working the lever-handle $a'$ the front plate $f$ works to and fro by means of the slots $i$, upon the screw-pins $h$, in a parallel plane. Each plate is cut away, as shown at $k$, to admit of the working of the arms $c$ and $e$, upon the plates $d$ and $f$.

The arrangement of shearing or clipping apparatus shown in figs. 13 and 14, may, if preferred, have the one handle rigid with or formed as part of the back shearing-plate, instead of both handles being free to move upon the screw-pins, as described.

Having thus described the object and nature of my said invention, and the manner in which the same is to be carried into effect,

I claim, without confining myself to the precise details herein described and shown, the several parts of the various figures hereinafter enumerated, namely:

1. The arrangement of the handles $b\ b'$, carrier-plate $a$, recess $a^2$, slot $g$, stud $ff'$, cutting-plates $d$ and $h$, and guide-bar $l$, constructed substantially as described.

2. The arrangement of the cutting-plates $c$ and $d$, recesses $e\ e$, studs $e'$, arms $f\ f$ of the handles $a\ a^1$, spring $g$, bar $h$, studs $h'\ h''$, and guide-slots $i$, as herein shown and described.

The above specification of my invention signed by me this 15th day of February, A. D. 1870.

GEORGE TWIGG.

Witnesses:
 WM. T. FOULKES,
 J. BRAME.